(12) United States Patent
Doggwiler et al.

(10) Patent No.: US 6,569,554 B1
(45) Date of Patent: May 27, 2003

(54) FUEL CELL BATTERY WITH A STACK OF PLANAR CELLS

(75) Inventors: Bruno Doggwiler, Hallau (CH); Emad Batawi, Winterthur (CH)

(73) Assignee: Sulzer Hexis AG, Winterthur (CH)

( * ) Notice: Subject to any disclaimer, the term of this patent is extended or adjusted under 35 U.S.C. 154(b) by 0 days.

(21) Appl. No.: 09/580,518

(22) Filed: May 25, 2000

(30) Foreign Application Priority Data

Jul. 28, 1999 (EP) ............................................. 99810680

(51) Int. Cl.$^7$ ............................ H01M 8/02; H01M 8/04
(52) U.S. Cl. ............................................ 429/26; 429/44
(58) Field of Search .......................................... 429/26

(56) References Cited

U.S. PATENT DOCUMENTS

| 5,186,806 | A | * | 2/1993 | Clark | 204/265 |
| 5,212,023 | A | | 5/1993 | Diethelm | |
| 5,230,966 | A | * | 7/1993 | Voss | 429/26 |
| 5,691,075 | A | | 11/1997 | Batawi | |
| 5,945,232 | A | * | 8/1999 | Ernst | 429/32 |
| 5,981,098 | A | * | 11/1999 | Vitale | 429/34 |
| 6,015,633 | A | * | 1/2000 | Carlstrom | 429/13 |
| 6,344,290 | B1 | * | 2/2002 | Bossel | 429/38 |
| 6,432,567 | B1 | * | 8/2002 | Doggweiler | 429/19 |

FOREIGN PATENT DOCUMENTS

| EP | 0 714 147 A1 | | 5/1996 | |
| EP | 1075033 | * | 6/2000 | H01M/8/02 |
| JP | 2001-52724 | * | 2/2001 | H01M/8/02 |

OTHER PUBLICATIONS

Hirschenhofer, J.H., "Fuel Cells: A Handbook," 1996, B/T Books, 3$^{rd}$, see p. 3–3.*

* cited by examiner

Primary Examiner—Carol Chaney
Assistant Examiner—Mark Ruthkosky
(74) Attorney, Agent, or Firm—Townsend and Townsend and Crew LLP

(57) ABSTRACT

The fuel cell battery, which contains a stack of planar cells, has the following features:
  a) Electrochemically active plates—so-called PENs—and interconnectors are arranged in an alternating sequence.
  b) The PENs and accordingly the interconnectors have in each case a first edge and a second edge, between which a straight or curved zone with a largely constant width extends.
  c) This zone is subdividable into sectors through which the two edges are connected.
  d) The interconnectors have profilings by means of which two fluids can be separately conducted through the cells.
  e) In each sector there are provided entry points for the first fluid at the first edge, entry points for the second fluid at the second edge as well as outlet points for both fluids.
  f) The outlet points open into a common passage.
  g) The second fluid is provided as a heat carrier medium for reaction heat which is liberated during an operation at the PEN.
  h) The interconnectors are single layered and their profiling is in each case executed in such a manner that both fluids are always conducted in contact with the PEN.
  i) At the first edge a turning region is provided by means of which a reversal of the flow direction of the second fluid results.
  k) Furthermore, the dimensioning of the cells is executed in such a manner that harmful thermal stresses in the PEN are not exceeded during the operation.

12 Claims, 3 Drawing Sheets

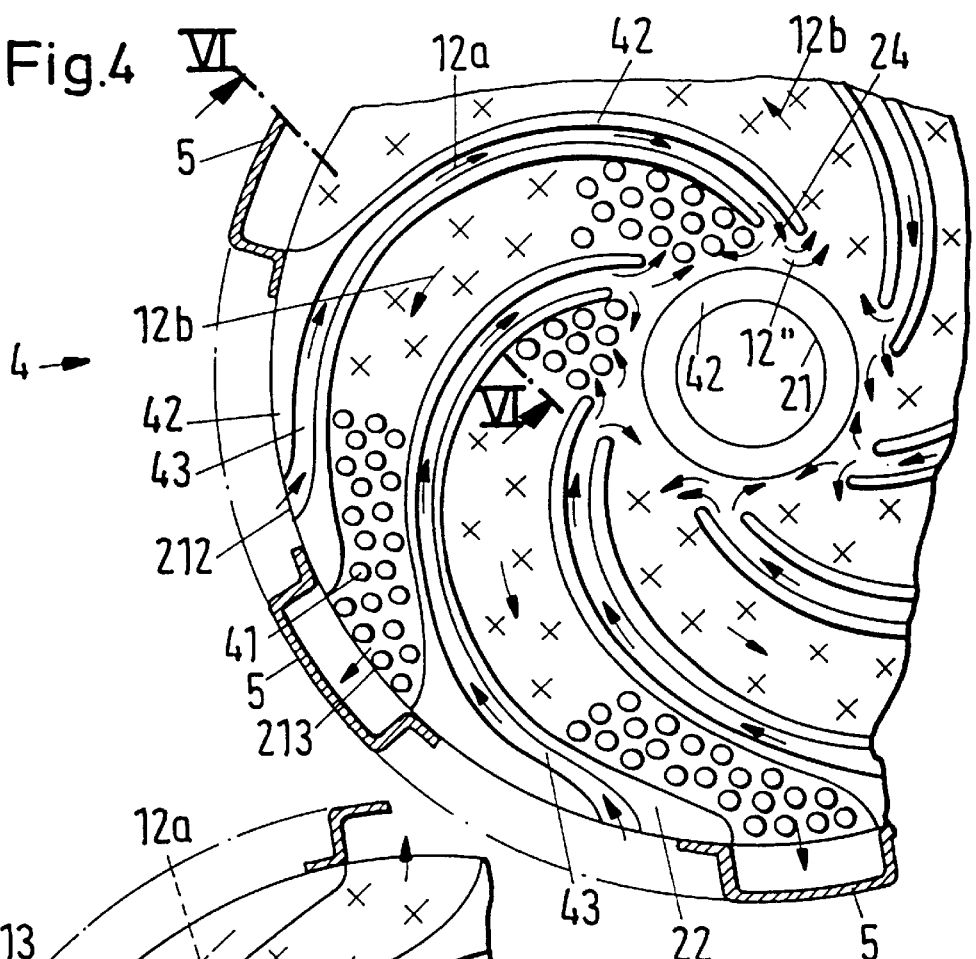
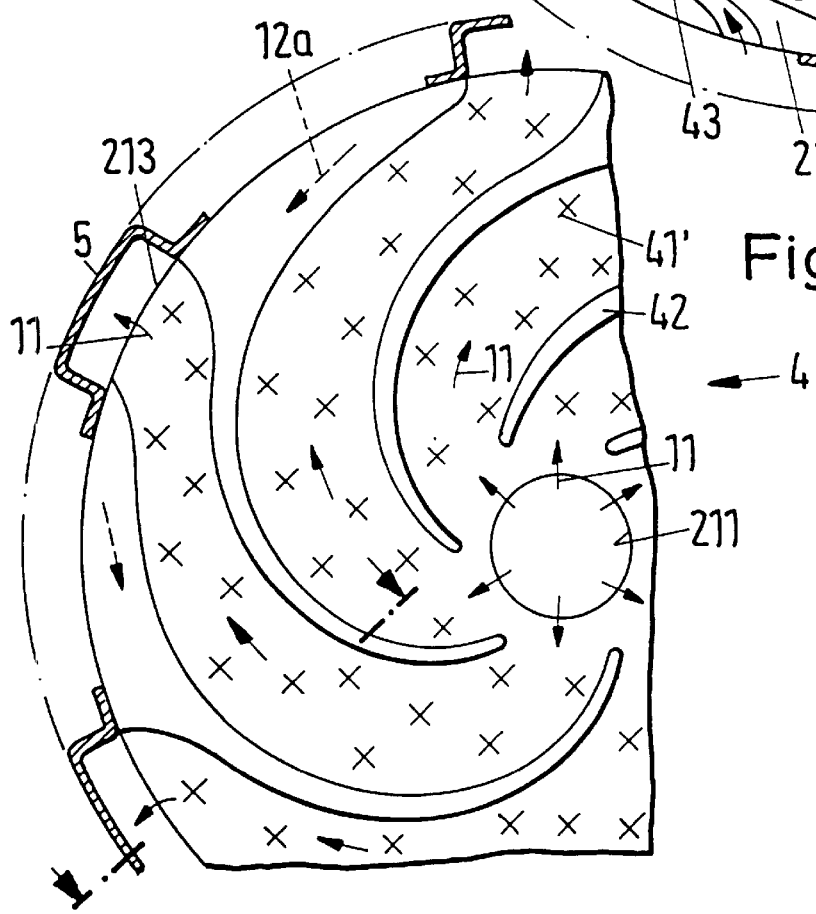

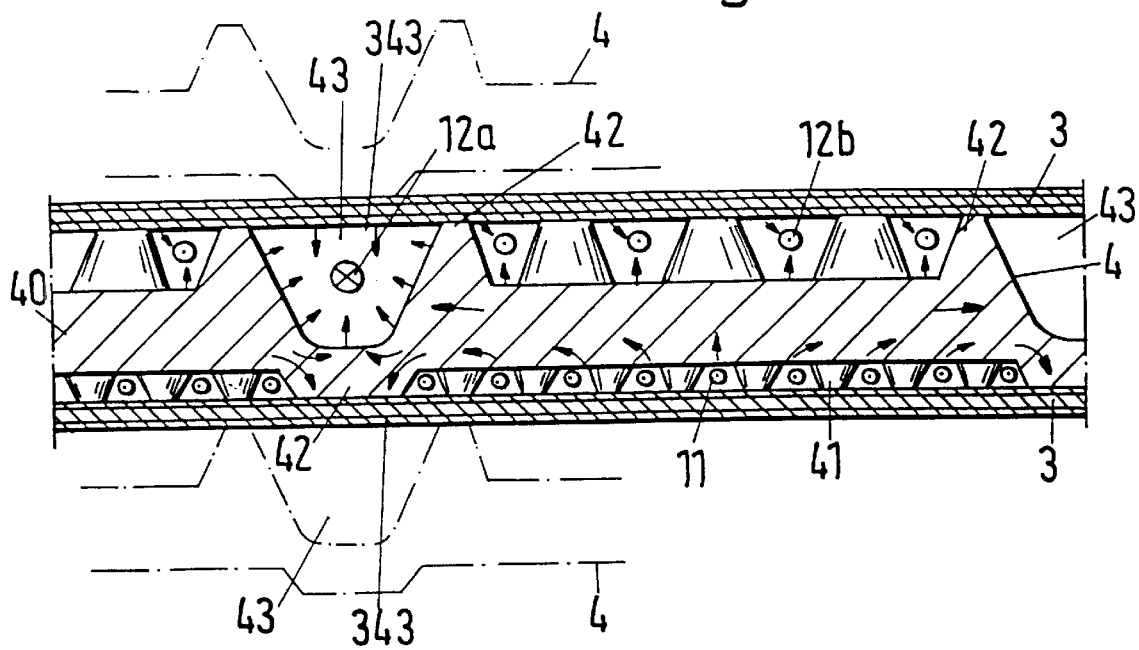
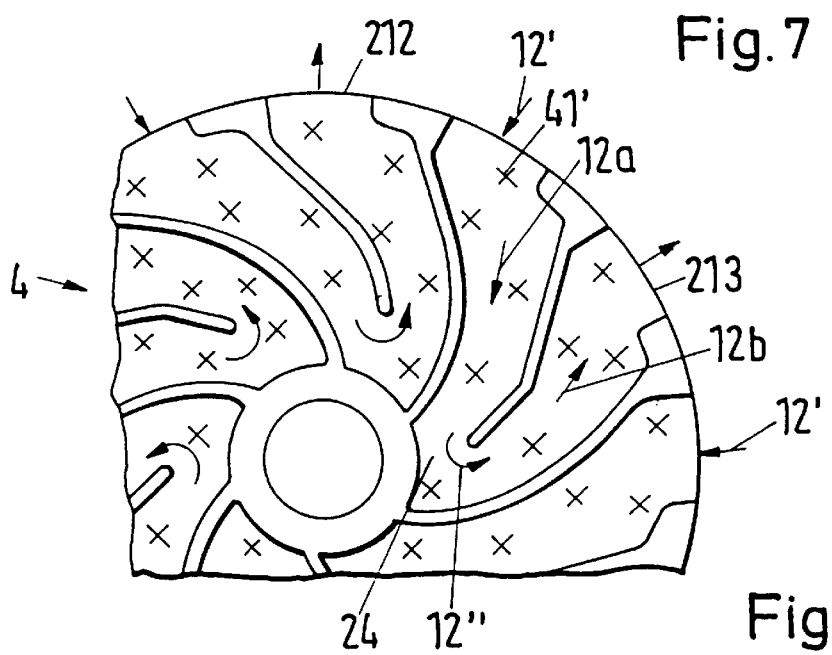
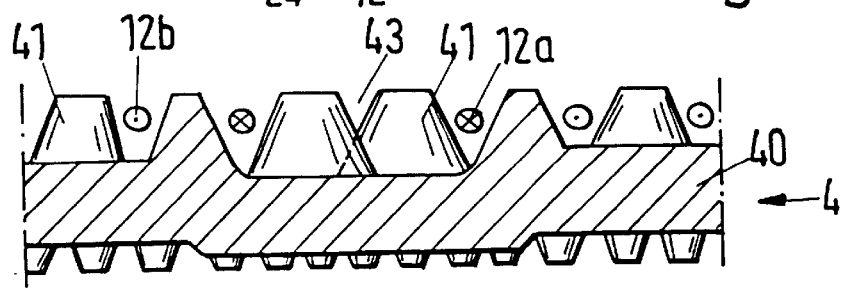

FUEL CELL BATTERY WITH A STACK OF PLANAR CELLS

BACKGROUND OF THE INVENTION

The invention relates to a fuel cell battery comprising a stack of planar cells and to a use of the battery in accordance with the invention.

A centrally symmetric fuel cell battery is known from EP-A-0 473 540, the interconnectors of which are designed as special temperature equalization bodies. These equalization bodies are heat exchangers, by means of which reaction heat is transferred to supplied air before the latter is brought into contact with the PENs, the electrochemically active elements of the fuel cells (PEN: Positive electrode, solid Electrolyte, Negative electrode). This heat exchanger is a plate-like hollow body, in the inner space of which the heat transfer to the air takes place. The two outer side surfaces of the interconnector have profilings, by means of which on the one hand electrical contacts to the electrodes of the PENs are produced and which on the other hand leave gap-like electrode spaces free between the interconnectors and the electrodes for the reaction components (air, fuel gas).

During the operation of the battery, temperature gradients arise in the PENs which are directed radially. These gradients are relatively small so that thermal stresses cause no damage, in particular tears, in the sensitive solid electrolytes of the PENs.

The interconnectors, which are designed as heat exchangers, are expensive; their share of the costs in the manufacture of the fuel cell battery is considerable. A plurality of suggestions for the manufacture of interconnectors have already been made with the goal of reducing the costs. For example in EP-A-0 936 688 an interconnector designed as a heat exchanger is described, for the manufacture of which one or two sintered bodies are used, with the sintered bodies being pre-shaped, namely through pressing of a powder mixture into the shape of the finished part and subsequent sintering.

SUMMARY OF THE INVENTION

It is an object of the invention to create a fuel cell battery, the manufacturing costs of which are further reduced.

The fuel cell battery, which contains a stack of planar cells, has the following features:

a) Electrochemically active plates, the so-called PENs, and interconnectors are arranged in an alternating sequence.

b) The PENs and accordingly the interconnectors have in each case a first edge and a second edge, between which a straight or curved zone with a largely constant width extends.

c) This zone is subdividable into sectors through which the two edges are connected.

d) The interconnectors have profilings by means of which two fluids can be separately conducted through the cells.

e) In each sector there are provided entry points for the first fluid at the first edge, entry points for the second fluid at the second edge as well as outlet points for both fluids.

f) The outlet points open into a common passage.

g) The second fluid is provided as a heat carrier medium for reaction heat which is liberated at the PEN during an operation.

h) In accordance with the invention the interconnectors are single layered and their profiling is in each case executed in such a manner that both fluids are always conducted in contact with the PEN.

i) A turning region is provided at the first edge by means of which a reversal of the flow direction of the second fluid results.

j) Furthermore, the dimensioning of the cells is executed in such a manner that harmful thermal stresses in the PEN are not exceeded during the operation.

The invention is based on a recognition relating to the following considerations. As model calculations have shown, the results of which are illustrated in the named EP-A-0 473 540, the reaction heat which is liberated at the PENs is transferred to the interconnectors mainly through thermal radiation. The heat transport as a result of a heat conduction through the air-filled electrode space is practically negligible. The wall of the interconnector has at each point a temperature which differs by only a few degrees Kelvin from the temperature at the corresponding point of the PEN. This wall temperature thus does not depend significantly on the temperature of the air to be heated up in the hollow space. The reason for this is a relatively low heat flow between the wall and the air.

The fact that such conditions are present in the heat transport in the interconnectors is not obvious as a result of the disclosed results of the model calculation. If one however becomes conscious of these conditions, then one can pose the question whether an interconnector which is designed as a hollow body is actually necessary in order to conduct off the reaction heat in the manner which is described in EP-A-0 473 540. The answer, that it is possible in a different manner, is given by the solution in accordance with the invention. The air (the second fluid) can already be brought into contact with the PEN at the entry point so that it is possible to design the interconnector in a single layer—thus more economically—and not as a double layered hollow body (two walls, one hollow space). The air to be heated admittedly causes additional temperature gradients in the PEN. Such gradients, which are directed tangentially (azimuthally), have an order of magnitude similar to that of the radial temperature gradients which result in the operation of known cells. Thus it can be expected that the thermal stresses do not take on substantially greater values in the use of the single layer interconnectors. Measures can also be provided as a result of which the additional components of the temperature gradients can be kept relatively low.

The named prior art relates to centrally symmetrical fuel cell batteries. The solution in accordance with the invention can however also be applied to batteries with for example rectangular cells in which the fuel gas (first fluid) is fed in at the one side and the air (second fluid) at the opposite side. In addition it is the case that the first fluid can be any desired gas composition with combustible components and the second fluid is a gas containing oxygen, under the assumption that exothermic reactions which supply electrical current can be carried out at the PEN with these gases.

The interconnectors of the fuel cell battery in accordance with the invention yield further advantages thanks to their being single layered:

a) the mass of the battery is smaller than that of the known batteries;

b) the constructional size is also reduced. Therefore the battery in accordance with the invention can also be easily used for a mobile application, for example as current supplying components in an automobile or for an emergency power aggregate which is to be rapidly transportable to a potential site of use.

In the following the invention will be explained with reference to the drawings.

BRIEF DESCRIPTION OF THE DRAWINGS

FIG. 4 shows an interconnector with a profiling seen from the air side, FIG. 5 shows the reverse side of the interconnector of FIG. 4, FIG. 6 is a cross-section through a part of a cell stack, FIG. 7 shows a variant of the interconnector of FIG. 4 and FIG. 8 is a cross-section through a further interconnector.

DESCRIPTION OF THE PREFERRED EMBODIMENTS

Figure 1:
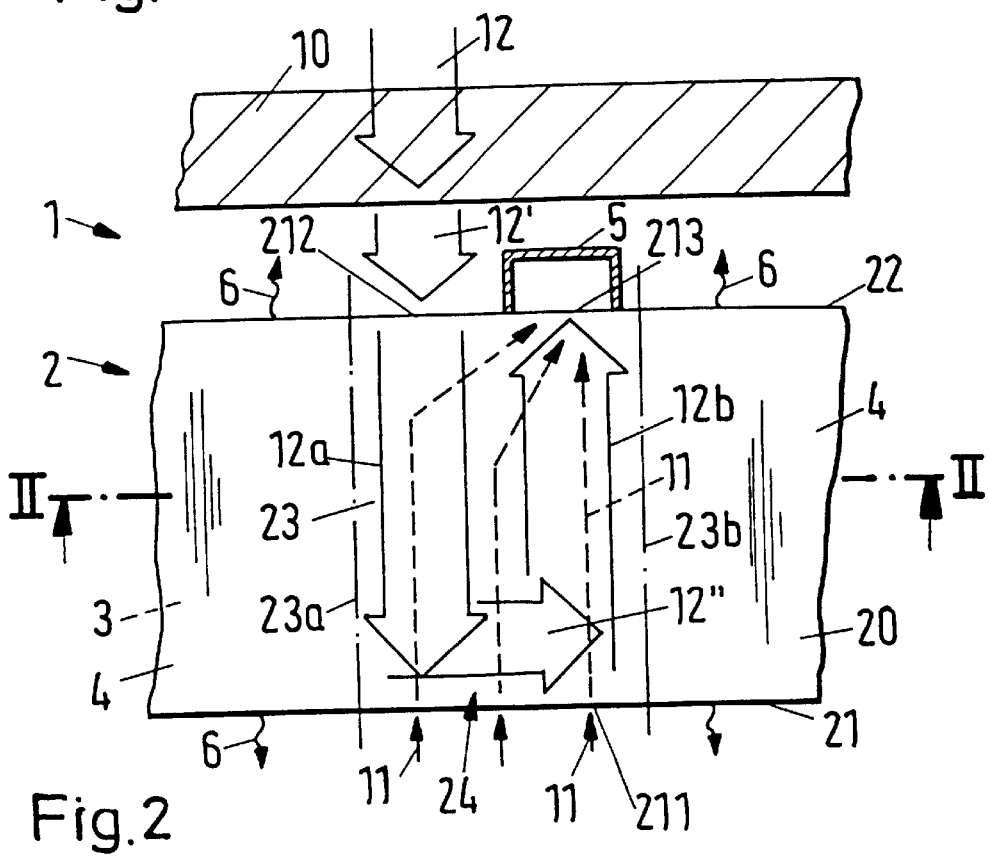
FIG. 1 is a schematic illustration of a fuel cell battery made in accordance with the invention.

A fuel cell battery 1, such as is schematically illustrated in FIG. 1, comprises a stack 2 of planar cells which each consist of a PEN 3 and an interconnector 4 (illustrated as a plan view). The PENs 3 and interconnectors 4 are arranged in an alternating sequence. The PENs 3 and, accordingly, the interconnectors 4 have in each case a first edge 21 and a second edge 22. Between the edges 21 and 22 there extends a zone 20 which is straight in the present illustration, but which can also be curved however. The zone 20 has a largely constant width. It can be subdivided into sectors 23 with side lines 23a and 23b which connect the two edges 21 and 22. The interconnectors 4 have profilings (cf. FIG. 2), by means of which two fluids 11 and 12 can be conducted separately through the cells. In each sector there are provided entry points 211 for the first fluid 11 at the first edge, entry points 212 for the second fluid 12 at the second edge as well as outlet points 213 for both fluids. The outlet points 213 open into a common passage 5 which extends along the stack 2 and which is advantageously used as an afterburner chamber, namely for the combustion of the components which are still present in the first fluid 11 and are still capable of reacting. The second fluid 12 is provided as a heat carrier medium for the reaction heat which is liberated on the PENs 3.

In accordance with the invention the interconnectors 4 are single layered. Their profiling is in each case executed in such a manner that both fluids 11 and 12 respectively are always conducted in contact with the PEN 3. At the first edge 211 a turning region 24 is provided, by means of which a reversal of the flow direction of the second fluid 12 results. The battery 1 is dimensioned in such a manner that harmful thermal stresses are not exceeded in the PEN 3 during operation. The dimensioning relates to the thickness of the interconnector 4, its profiling and its width (=width of the zone 30). The air factor (=the factor which specifies the stoichiometric air excess) also plays a role in the dimensioning and likewise the amount of heat which is given off to the surroundings by the stack 2 as radiation 6.

The surrounding comprises a sleeve 10 at the or around the cell stack 2 which is permeably structured so that radiative heat 6 can be taken up by the second fluid 12 during inflow to the cell stack 2. A large portion of the heat—at least about one-third—which arises in the PEN reactions is advantageously carried off out of the cell stack 2 through radiation 6. Thus the second fluid 12 can enter relatively hot into the cell stack 2 so that the additional thermal stresses which are caused in the PEN 3 through direct contact with the fluid 12 are relatively small. It is also advantageous if a reformer is arranged on the side of the first edge 21 in which a fuel is converted by means of endothermic reactions into a form which is suitable for the PEN reactions. The radiation 6 can thus be used as a heat source for the endothermic reactions.

The single layered interconnectors 4 are advantageously pre-shaped sintered parts; or they are manufactured of such. Since the material to be used for the manufacture contains chromium, the sintered parts must also be provided with suitable protective layers.

Figure 2:
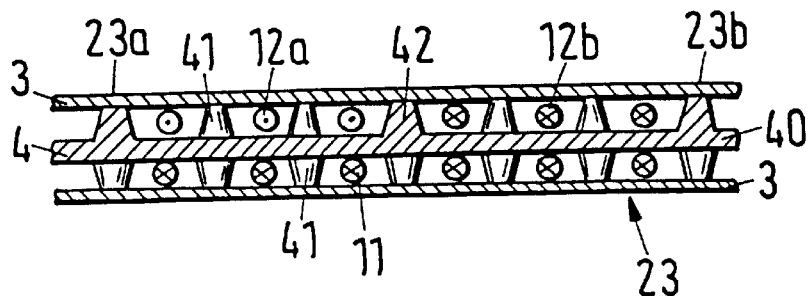
FIG. 2 is a cross-section through a cell and a second, adjacent PEN.

The interconnector 4 which is shown in FIG. 2 has profilings which form relief structures on a partition wall 40. These profilings comprise knob-like elevations 41 and comb-like elevations or webs 42. On the one hand the elevations 41 and 42 produce electrical contacts to the PENs 3. On the other hand the comb-like elevations or webs 42 serve to conduct the fluids 11 and 12, in particular at the side of the second fluid 12, which is directed as flow 12a from the edge 22—see FIG. 1—to the turning region 24 (arrow 12") and is directed in reverse as flow 12b.

Figure 3:
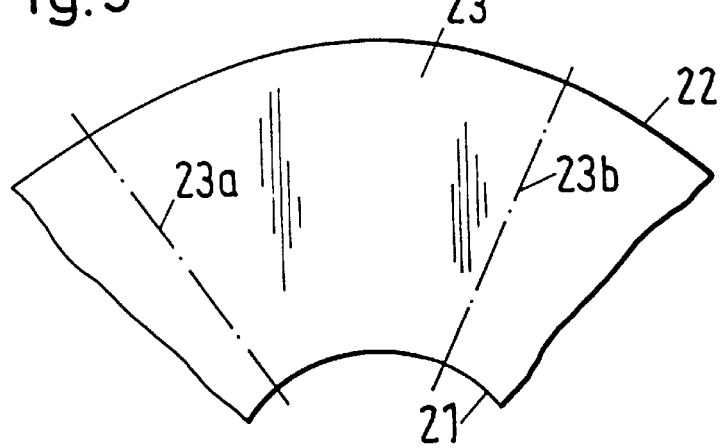
FIG. 3 is a plan view of a zone of a usual basic form of the fuel cell battery.

The fuel cell battery 1 is advantageously designed to be centrally symmetrical. In FIG. 3 a corresponding section of the zone 20 with a sector 23 is illustrated. The edge 21 lies on the surface of a central passage in this geometry, via which the first fluid 11 can be fed into the cell stack 2. An elongate, cylindrical reformer is advantageously arranged in this passage.

FIG. 4 shows an interconnector 4 with a profiling seen from the air side. The flow of the air, i.e. of the second fluid 12, is indicated by arrows. Comb-like elevations or webs 42 have a spiral shape. (A sector 23 in accordance with FIG. 1 or 4—not drawn in—has a corresponding spiral shape. Six sectors are present.) The second fluid 12 (arrow 12') is conducted from the entry point 212 through a passage 43 which is formed by the comb-like elevations 42 to the turning region 24 (arrow 12a). There the flow direction of the second fluid 12 is reversed (arrow 12") so that the fluid 12 flows back to the edge 22 in the opposite direction (arrow 12b). In the regions between the passages 43, in which the fluid 12 flows back, the profiling consists of knob-like elevations 42, which is partly schematically illustrated as a field with crosses 41'. At the outlet point 213 the fluid 12 enters into the passage-like afterburner chamber 5.

The passages 43 can also be rectilinear instead of spiral-shaped and indeed directed radially to the center of the interconnector 4. Instead of six sectors 23 the profiling of the interconnector 4 can also have fewer or more sectors 23, advantageously a number between four and ten.

FIG. 5 shows the reverse side of the single layered interconnector 4 of FIG. 4. On this side the first fluid 11 is conducted from a central passage (within the edge 211) between knob-like elevations 41' and by means of comb-like elevations 42 to the outlet points 213 at the outer edge 212.

FIG. 6 shows a cross-section through the interconnector 4 of FIGS. 4 and 5 along the line VI—VI in FIG. 4. The heat transport in the cell 3, 4 is indicated by arrows which lie in the plane of the diagram. The cross-section of the passage 43 has a depth in the direction perpendicular to the PEN 3 which is greater in comparison with the corresponding depths of the remaining profiling. Thanks to the relatively large passage cross-section a flow of the fluid 12 (arrow 12a) develops which has a minimum heat extraction from an overflowed region 343 of the PEN 4 as a result. Practically no current generating reactions take place in the middle of this region 343. Heat is supplied from the interconnector 4 to the region 343 via the comb-like elevation 42 on the side of the fluid 11.

The air side of the interconnector 4 can be designed in such a manner that—see FIG. 6—the second fluid 12 (arrows 12', 12a) is already conducted through a profiling with knob-like elevations 41' when being fed in. Current generating reactions likewise take place in this infeed region.

In a further exemplary embodiment with an interconnector 4 in accordance with FIG. 8 there is a combination of features for the infeed passage 43 which are given from the two embodiments in accordance with FIGS. 6 and 7. Thanks to knob-like elevations 41 in the passage 43 the current supplying PEN reactions take place there as well—although to a somewhat reduced extent.

What is claimed is:

1. Fuel cell battery comprising a stack of planar cells including
   a) electrochemically active PEN plates and interconnectors arranged in an alternating sequence,
   b) the PEN plates and the interconnectors each having a first edge and a second edge between which a straight or curved zone of substantially constant width extends,
   c) the zone being subdividable into sectors extending between the first and second edges,
   d) the interconnectors having profilings permitting first and second fluids to be separately conducted through the cells,
   e) entry points for the first fluid at the first edge of each sector, entry points for the second fluid at the second edge of each sector, and outlet points for both fluids,
   f) the outlet points opening into a common passage for the entire cell stack, and
   g) the second fluid being a heat carrier medium for reaction heat which is liberated at the PEN plates when in operation, the interconnectors being single layered and having a profile so that the second fluid is always conducted in contact with the PEN plates; the interconnectors defining a turning region at the first edge for reversing a flow direction of the second fluid that is parallel to the interconnector; and means for removing a portion of the heat generated by the PEN plates through radiation and preheating the second fluid with at least a portion of the radiation removed from the cell stack so that the second fluid enters the cell stack relatively hot compared to an unheated fluid and thermal stresses generated in the PEN plates through contact with the second fluid are kept relatively low compared to contact with the unheated fluid and prevented from harming the PEN plates.

2. Fuel cell battery in accordance with claim 1 wherein the interconnectors are pre-shaped sintered parts or are manufactured from sintered material.

3. Fuel cell battery in accordance with claim 1 wherein the profilings of the interconnectors comprise knobs which form electrical contacts to the PEN plates.

4. Fuel cell battery in accordance with claim 1 wherein the profiling of the interconnectors for conducting the first and second fluids have webs on a side of the interconnector facing the PEN plates, the webs forming electrical contacts to the PEN plates.

5. Fuel cell battery in accordance with claim 4 wherein at least portions of the webs have a spiral shape, or a partly straight and a partly curved shape.

6. Fuel cell battery in accordance with claim 1 wherein each sector of the interconnectors defines a passage for the second fluid communicating with the turning region, the turning region having a cross-section which has a depth in a direction perpendicular to the PEN plates which is greater than a corresponding depth of the passage.

7. Fuel cell battery in accordance with claim 1 wherein the cells are configured in such a manner that during the operation of the battery at least one-third of the waste heat generated by the PEN plates is removed by radiation.

8. Fuel cell battery in accordance with claim 1 wherein the cells are substantially centrally symmetrical and the first fluid is fed in via a central passage which extends in an axial direction, wherein a reformer for processing the first fluid is arranged in the central passage, and wherein the common passage defines an afterburner chamber communicating with the outlet points, and including a sleeve disposed about the stack and permeably structured so that radiated reaction heat from the PEN plates is transferred to the second fluid during inflow to the cells.

9. Fuel cell battery in accordance with claim 8 wherein the sectors are of equal size and number between four and ten.

10. Fuel cell battery comprising a stack of planar cells including
    a) electrochemically active PEN plates and interconnectors arranged in an alternating sequence,
    b) the PEN plates and the interconnectors each having a first edge and a second edge between which a straight or curved zone of substantially constant width extends,
    c) the zone being subdividable into sectors extending between the first and second edges,
    d) the interconnectors having profilings permitting first and second fluids to be separately conducted through the cells,
    e) entry points for the first fluid at the first edge of each sector, entry points for the second fluid at the second edge of each sector, and outlet points for both fluids,
    f) the outlet points opening into a common passage for the entire cell stack, and
    g) each interconnector defining first and second passages and a turning region fluidly connecting the passages for flowing the second fluid substantially parallel to and in contact with the interconnector, the turning region being arranged to cause a reversal of the flow direction of the second fluid between the first and second passages while keeping the flow of the second fluid in the turning region parallel to and in contact with the interconnector.

11. Fuel cell battery comprising a stack of planar cells including
    a) electrochemically active PEN plates and interconnectors arranged in an alternating sequence,
    b) the PEN plates and the interconnectors each having a first edge and a second edge between which a straight or curved zone of substantially constant width extends,
    c) the zone being subdividable into sectors extending between the first and second edges,
    d) the interconnectors having profilings permitting first and second fluids to be separately conducted through the cells,
    e) entry points for the first fluid at the first edge of each sector, entry points for the second fluid at the second edge of each sector, and outlet points for both fluids,
    f) the outlet points opening into a common passage for the entire cell stack, g) the second fluid being a heat carrier medium for reaction heat which is liberated at the PEN plates during an operation, and h) each interconnector defining a flow passage for the second fluid beginning and ending at the second edge which is open in the direction of the associated PEN plate and including a turning region intermediate ends of the flow passage and proximate the first edge which is open in the direction of the associated PEN plate, the turning region being configured so that the second fluid flows parallel to the interconnector through the turning region to maintain contact between the second fluid flowing in the passage and the turning region and the associated PEN plate; and means for removing a portion of the heat generated by the PEN plates through radiation and preheating the second fluid with at least a portion of the radiation removed from the PEN plates so that the second fluid enters the cell stack relatively hot compared to an unheated fluid and thermal stresses generated in the PEN plates through contact with the second fluid are kept relatively low compared to contact with the unheated fluid and prevented from harming the PEN plates.

12. An automobile comprising a fuel cell battery comprised of a stack of planar cells including a) electrochemically active PEN plates and interconnectors arranged in an alternating sequence, b) the PEN plates and the interconnectors each having a first edge and a second edge between which a straight or curved zone of substantially constant width extends, c) the zone being subdividable into sectors extending between the first and second edges, d) the interconnectors having profilings permitting first and second fluids to be separately conducted through the cells, e) entry points for the first fluid at the first edge of each sector, entry points for the second fluid at the second edge of each sector, and outlet points for both fluids, f) the outlet points opening into a common passage for the entire cell stack, g) the second fluid being a heat carrier medium for reaction heat which is liberated at the PEN plates during an operation, and h) each interconnector defining a flow passage for the second fluid beginning and ending at the second edge which is open in the direction of the associated PEN plate and including a turning region intermediate ends of the flow passage and proximate the first edge which is open in the direction of the associated PEN plate, the turning region being configured so that the second fluid flows parallel to the interconnector through the turning region to maintain contact between the second fluid flowing in the passage and the turning region and the associated PEN plate; and means for removing a portion of the heat generated by the PEN plates through radiation and preheating the second fluid with at least a portion of the radiation removed from the PEN plates so that the second fluid enters the cell stack relatively hot compared to an unheated fluid and thermal stresses generated in the PEN plates through contact with the second fluid are kept relatively low compared to contact with the unheated fluid and prevented from harming the PEN plates.

* * * * *